Patented Aug. 10, 1943

2,326,531

UNITED STATES PATENT OFFICE 2,326,531

COLORING OF SYNTHETIC RESINOUS COMPOSITIONS

William Elliott Frew Gates, Welwyn Garden City, England, assignor to Imperial Chemical Industries Limited, a corporation of Great Britain No Drawing. Application December 10, 1941, Serial No. 422,330. In Great Britain January 8, 1941

7 Claims. (Cl. 18—55.1)

This invention relates to improvements in the art of coloring of masses of synthetic resinous compositions, intended for the ultimate production of molded articles exhibiting a desired gradation of color and/or shading.

Such articles have not hitherto been possible to produce, as ordinary methods of incorporation of dyestuffs invariably led either to homogeneous coloring or to non-uniform coloring in which the non-uniformity was impossible to control.

This invention has as an object a means of producing masses of synthetic resinous compositions, and subsequently molded articles, having a desired gradation in coloring.

I have now found that this object is accomplished by applying the coloring medium by a process of diffusion to suitably constituted masses of the type hereinafter described.

According to this invention, therefore, I expose a suitably constituted mass of synthetic resinous composition to a local concentration of coloring medium, under such conditions that said coloring medium is enabled to penetrate by diffusion into said mass. By this method, the color imparted to said mass is relatively intense at its point of contact with the source of coloring matter, and diminishes smoothly in intensity towards those parts of said mass remote from the said point of contact.

Synthetic resinous compositions having a physical state suitable for this purpose consist of mixtures of polymeric and monomeric substances or mixtures of polymeric materials associated with relatively high proportions of liquid plasticisers or of polymeric materials softened by the additions of suitable organic liquids which are solvents for the coloring medium employed hereinafter. The mixtures may be of the consistency of syrups, jellies, slushes, pastes or doughs. Blocks of completely polymerised material cannot be successfully dyed by the method described herein owing to the slow rate of penetration of the coloring medium into such material. Masses consisting of finely divided polymer can however be successfully treated. The masses of synthetic resinous compositions may be of any desired shape or size which is convenient of operation.

Polymeric materials suitable for the production of such synthetic resinous compositions are, for example, polymers derived from monomeric methyl acrylate, methyl methacrylate, ethyl methacrylate, n-butyl methacrylate, methacrylic acid, methacrylamide, styrene, vinyl chloride, vinyl acetate, or interpolymers of the above compounds. Said polymeric materials may or may not contain a plasticiser. The synthetic resinous compositions may contain a mixture of one or more polymeric substances.

Suitable monomeric liquids are, for example, those given in the preceding paragraph. In my process it is not necessary for a polymer to be mixed with the monomer from which it was derived. A mixture of monomers can also be used if desired.

Examples of other organic liquids which swell or dissolve polymeric materials are chloroform, acetone, butyl acetate, benzene, toluene, acetic acid, dibutyl phthalate and tricresyl phosphate.

A preliminary experiment is generally necessary to determine which solvent is best suited for use in conjunction with any particular polymer, interpolymer or mixture of polymers or interpolymers.

The coloring medium should be presented to the synthetic resinous composition in a form adapted to give penetration of the desired order. Thus, a solution of a coloring medium gives relatively rapid and intense coloration, which is suitable for the treatment of large masses. Small masses, on the other hand, which are desired to be colored only throughout a small proportion of their bulk, are better treated by means of a coloring medium dissolved or dispersed in a viscous or even solid medium. The latter method is especially suitable where the synthetic resinous composition is of a doughy consistency and therefore contains of itself sufficient liquid to enable the coloring matter to enter the said composition. When a dyestuff is incorporated in a polymerisable material, said material can, if desired, be polymerised at a subsequent stage and in contact with the tinted synthetic resinous composition so that a uniformly colored layer is obtained at an extremity of the block so produced.

Since the rate at which the coloring medium will diffuse into the mass is clearly dependent upon the physical nature of the latter, it follows that a suitable period of time must be allowed to elapse, in order to attain the desired extent and intensity of penetration. This period may readily be determined in any given case, by means of a suitable preliminary experiment.

When dyestuffs are employed as the coloring medium they may be of any desired type provided that they are appreciably soluble in the liquid vehicle used, for instance dyestuffs known under the registered trade-mark "Waxoline," e. g. Waxoline Red IIIS, are suitable in conjunction with most organic solvents. Where, however, said vehicle is a polymerisable liquid, the dyestuff should preferably not be one which is a marked inhibitor of polymerisation and a preliminary test should be made on the effect of any selected dyestuff on the rate of polymerisation of said polymerisable liquid.

The material to be treated may, if desired, be uniformly colored in known manner prior to further coloration according to the invention or the material may contain a substance which reacts with another substance allowed to diffuse into said material, to produce an attractively colored product. Thus my invention includes also the step of carrying out the diffusion process with materials which may not of themselves be colored but which can react in situ to produce colored materials. At least one of said materials should be applied by diffusion. For example if ferric chloride is dissolved in a doughy mixture of methyl methacrylate polymer and monomer and tannic acid allowed to diffuse into said mixture a shaded grey tint is produced in said mixture. If salicylic acid is used insted of tannic acid a shaded red coloration is produced.

When it is not possible to remove the mass of synthetic resinous composition from the mold in which the dyeing operation is carried out without destroying its shape it is necessary to harden said mass by the application of heat and/or other suitable means. This operation can in some cases be avoided by carrying out the dyeing operation in the mold in which the finished molded article is produced.

When moulding articles from synthetic resinous compositions tinted in the manner described above, it is necessary to charge the mould in which said moulded articles are produced with a slightly greater amount of said synthetic resinous composition than the weight of the finished moulded article. It is often unnecessary to treat individually masses of synthetic resinous composition of such sizes, but such units can be produced by cutting up by suitable means a large mass of synthetic resinous composition tinted in the manner herein described. In the case where the dyeing operation is carried out in situ in the mould in which the subsequent moulding operation is made, the requisite amount of the synthetic resinous composition is, of course, introduced into the mould prior to the dyeing operation.

In order that my invention may be fully understood, I submit the following by way of example, to which however, my invention is by no means limited. The parts are by weight.

*Example I*

A methyl methacrylate polymer/methyl methacrylate monomer dough was prepared from an initial mixture of 2 parts of methyl methacrylate monomer and 7 parts of thermoplastic resinous material, the latter comprising filled pigmented plasticised methyl methacrylate polymer containing

| | Per cent |
|---|---|
| Dibutyl phthalate (plasticiser) | 2.0 |
| Pigment known as Chrome Orange | .005 |
| Pigment known as Chrome Yellow | .01 |
| Filler "Titanex Extra T," a titanium dioxide pigment | .37 |

The dough was then filled into a shallow container (of dimensions 1.5 cms.×9 cms. diameter) which was then placed in an inverted position on a dyed sheet of methyl methacrylate polymer (the latter having been dyed by immersing in an ethyl alcohol solution of 0.3% of the dyestuff known as "Waxoline Yellow 1S," an oil-soluble monoazo dyestuff for a period of 2 hours at 60° C., and subsequently removing and drying off the sheet in a current of warm air).

The assembly was allowed to remain until the desired extent and intensity of coloration was attained by the dough.

The mass of tinted material was then sliced into preforms of dimensions 1.5×0.5×0.5 cms. The tinted preforms were then transferred to an oven and maintained at a temperature of 60° C. for 2 hours, whereby the mass was completely polymerised. The preforms thus obtained were then used to mould teeth in known manner, the more deeply tinted ends being caused to form the necks of the teeth.

The appearance of the moulded teeth was a true likeness to that of natural teeth, embracing the requisite simulation of coloring and shading of the latter to a remarkable degree.

*Example II*

The coloring medium utilised in this illustration comprised the following:

| | Parts |
|---|---|
| Granular methyl methacrylate polymer | 8 |
| Toluene | 80 |
| Methylated spirit | 20 |
| Dibutyl phthalate | 2.0 |
| Dyestuff known as "Waxolin Yellow 1S" | 0.2 |

A film of this solution was flowed on a glass plate and dried off in a current of hot air at 40° C., to produce a smooth colored film. The latter was then used to color a dough consisting of three parts of clear methyl methacrylate polymer (containing 10% by weight of dibutyl phthalate), and one part of methyl methacrylate monomer. The dough was contained in a tube 1" diameter x 2½", and contact was established between the colored film and the dough, in a manner similar to that described in Example I.

The coloring matter was allowed to penetrate up through the clear dough to a height of approximately 1" to 1½", thereby producing a shaded preform.

This doughy preform was then packed into a plaster mould of a shape suitable for the fashioning of a shaving-brush handle. The mould was clamped tightly and totally immersed in boiling water for a period of two hours in order to complete the polymerisation of the monomer, and was subsequently transferred to a cold water bath and cooled for half an hour. The moulded handle showed a graded coloration of pleasing appearance.

*Example III*

A solution was prepared comprising:

| | Grams |
|---|---|
| Methyl methacrylate monomer | 8 |
| Benzoyl peroxide | 0.005 |
| Dyestuff known as "Sudan Brown" | 0.0002 |

The colored solution therefrom was poured into a 100 ml. beaker. 13.5 gms. of powdered synthetic resinous material of similar composition to that used in Example I, and sieved to pass through a 25 B. S. S. sieve, was then gradually poured into the liquid in the beaker whilst maintaining a slight tapping movement of the latter, until all the powder became thoroughly wetted and homogeneously tinted. The material thus endowed with an initial degree of uniform coloring was then provided with a gradation of coloring according to the invention:

0.5 gm. of methyl methacrylate monomer containing .01% of the dyestuff known as Sudan Brown was carefully poured on to the surface of the colored slurry in the beaker, and distributed itself over the whole of the surface thereof. This deeper shade very slowly diffused down through the mass, until after about 16 hours, the coherent dough now formed showed a shaded effect similar to that as required in artificial teeth.

The dough was then removed and sliced vertically into preforms of a suitable size for moulding teeth.

Alternatively, the benzoyl peroxide may be omitted from the initial solution mixture, and the final product may be hardened by evaporation and/or polymerisation at the preform stage, and then compression-moulded in the usual manner, with the deeply shaded portion at the neck of the tooth.

*Example IV*

A syrupy solution consisting of 6 grams of polymethyl methacrylate, 0.02 gram of benzoyl peroxide and 0.1 gram of ferric chloride, in 100 grams of monomeric methyl methacrylate was poured into a glass tube of 1" diameter. A syrupy solution consisting of 1.2 grams of polymethyl methacrylate, 0.02 gram of salicylic acid and 0.004 gram of benzoyl peroxide in 20 grams of monomeric methyl methacrylate was poured onto the top of the syrup containing the ferric chloride, care being taken to avoid appreciable mixing of the two solutions.

The syrup was polymerized by heating the tube in an autoclave at 60° C. under a pressure of 150 lbs./sq. inch of nitrogen, for nine huors.

The glass mould was then broken and the fully polymerised rod removed. Said rod showed an attractive coloration in which there was a uniformly coloured yellow (ferric chloride), a shaded red (product of reaction between the salicylic acid and the ferric chloride) and a colourless (salicylic acid) portion. After suitable machining, the rod was utilised as an umbrella handle.

*Example V*

500 grams of a mixture of 85 parts of methyl methacrylate monomer with 15 parts of n-butyl methacrylate and 0.055 part of benzoyl peroxide were thickened to a syrup by heating at 80° C. To said syrup were added 10 grams of a 1.5% solution of a dyestuff sold under the name "Rhodamin C.G.B/500" in methylated spirits. The colored syrup was cast into a sheet $\frac{3}{32}$" thick by the method given in British Patent Specification 433,540. The resultant sheet had a red fluorescent color and showed a marked fluorescent effect in ultra violet light. A design was cut from said sheet and placed in a glass cell of the type described in the above patent specification. The cell was then filled with a syrup made by heating monomeric methyl methacrylate with 0.055% of benzoyl peroxide at 80° C. This syrup was then polymerised and the resultant sheet showed a brilliantly fluorescent design embedded in a clear resin with a little fluorescent dye diffusing into the clear resin giving a pleasing gradation of color around the edge of said design.

*Example VI*

50 grams of a mixture of 20 parts of finely divided polystyrene with 8 parts of chloroform were poured into a circular mould of ½" diameter and the top of the mould covered to prevent evaporation of the solvent. The tube and its contents were allowed to stand until the latter had become rigid. A mixture of 10 parts of polystyrene, 10 parts of chloroform and 0.1 part of a dyestuff sold under the registered trade-mark of "Waxoline" Red 1V.S. was then poured on top of the contents of the tube. The mould was again covered to prevent evaporation of the solvent.

After 6 hours the mould was uncovered and placed in an air oven at 45° C. for 20 minutes and then cooled at 0° C. The block of synthetic resinous composition was removed from the mould and the layer in which the dyestuff was originally dissolved sliced off. The block was subsequently left at 45° C. for 14 days to remove excess chloroform and then moulded to form a tooth brush handle.

The finished moulding showed a pleasing gradation of coloring along its length.

As many apparently widely different embodiments of this invention may be made without departing from the spirit and scope thereof, it is to be understood that the invention is not limited to the specific embodiments thereof except as defined in the appended claims.

I claim:

1. Method of preparing molded articles having a color gradation which comprises preparing a dough essentially composed of a polymerisable monomer and a plastic polymer, contacting one surface of said dough with coloring matter soluble in said polymerisable monomer until said coloring matter has penetrated said dough by diffusion an appreciable distance, and thereafter subjecting said dough to polymerising conditions to convert said polymerisable monomer to polymer.

2. Method of preparing molded articles having a color gradation which comprises preparing a dough essentially composed of a polymerisable monomer and a plastic polymer, contacting one surface of said dough when coloring matter soluble in said polymerisable monomer until said coloring matter has penetrated said dough by diffusion an appreciable distance, subdividing said dough into preforms, and molding said preforms at an elevated temperature whereby said polymerisable monomer is converted to polymer.

3. Method of preparing molded articles having a color gradation which comprises preparing a dough essentially composed of methyl methacrylate monomer and methyl methacrylate polymer, contacting one surface of said dough with coloring matter soluble in methyl methacrylate monomer until said coloring matter has penetrated said dough by diffusion an appreciable distance, and thereafter subjecting said dough to polymerising conditions to convert said methyl methacrylate monomer to polymer.

4. Method of preparing molded articles having a color gradation which comprises preparing a dough essentially composed of methyl methacrylate monomer and methyl methacrylate polymer, contacting one surface of said dough with a solution of a dyestuff dissolved in methyl methacrylate monomer until said solution has penetrated said dough by diffusion an appreciable distance, subdividing said dough into preforms, and molding said preforms at an elevated temperature whereby said methyl methacrylate monomer is converted to polymer.

5. Method of preparing molded artificial teeth having a color gradation which comprises preparing a dough essentially composed of a polymerisable monomer and a plastic polymer, forming said dough into a sheet having a thickness at least equal to the height of a tooth, contacting one side of said sheet with coloring matter soluble in said polymerisable monomer until said coloring matter has penetrated said sheet by diffusion an appreciable distance, slicing said sheet vertically into preforms, and molding said preforms into artificial teeth at an elevated temperature.

6. Method of preparing molded artificial teeth having a color gradation which comprises preparing a dough essentially composed of methyl methacrylate monomer and methyl methacrylate polymer, contacting one surface of said dough with a solution of a dyestuff dissolved in methyl methacrylate monomer until said solution has penetrated said dough by diffusion an appreciable distance, and thereafter subjecting said dough to polymerising conditions to convert said methyl methacrylate monomer to polymer.

7. Method of preparing artificial teeth having a color gradation which comprises preparing a dough essentially composed of methyl methacrylate monomer and methyl methacrylate polymer, forming said dough into a sheet having a thickness at least equal to the height of a tooth, contacting one side of said sheet with a solution of a dyestuff dissolved in methyl methacrylate monomer until said solution has penetrated said sheet by diffusion an appreciable distance, slicing said sheet vertically into preforms, and molding said preforms into artificial teeth at an elevated temperature.

WILLIAM ELLIOTT FREW GATES.